3,308,109
PROCESS FOR RECOVERING UNPOLYMERIZED MONOMER

Herman J. Sampson, Jr., Martinsville, and Richard D. Tomey, Waynesboro, Va., assignors to E. I. du Pont de Nemours and Company, Wilmington, Del., a corporation of Delaware
No Drawing. Filed Jan. 7, 1965, Ser. No. 424,109
5 Claims. (Cl. 260—88.7)

This application is a continuation-in-part of our earlier application Serial No. 188,551, filed April 18, 1962, and now abandoned.

This invention relates to a process for recovering unpolymerized monomers in a polymerization process wherein less than quantitative conversion of the monomers to polymer is obtained. More particularly, the process relates to the recovery of monomers in the polymerization of acrylonitrile alone or with other copolymerizable ethylenically unsaturated monomers.

In the polymerization of acrylonitrile, considerable effort has been expended in providing polymers of superior whiteness. This goal has been obtained by conducting the polymerization under acid conditions with a high activator-to-catalyst ratio with the amount of activator being high enough that an excess of the activator remains after the polymerization is terminated. In this process, the polymerization is terminated by the addition of an amino carboxylic acid sequestering agent to the polymer-containing medium.

In the improved polymerization process, as in other known polymerization processes generally, quantitative conversion of the monomer to polymer is not obtained, and it has been found that methods previously used in recovering the unreacted monomers are not satisfactory. The aqueous filtrate which is obtained upon separating the polymer from the polymerization medium is unstable, resulting in the formation of various reaction products which contaminate the recovery system and result in a reduced amount of monomer recovered. For example, with an excess of a sulfoxy activator present and using a prior-art alkaline recovery system, a non-volatile monomer-sulfoxy compound adduct is formed in the distillation column which leads to substantial monomer loss as well as a waste-disposal problem. If carried to a natural stream in the waste from the column tails, such adduct is oxidized by aerobic microorganisms in the stream, depleting oxygen in the stream and seriously upsetting the natural biological balance.

This invention provides a process for the recovery of unpolymerized monomers from an acrylonitrile polymerization process with a minimum loss of monomer. It also provides a monomer recovery process, for such a process, in which the formation of undesirable by-products is minimized. It further provides acrylonitrile monomer recovery in which operation can be carried out with minimum loss of time due to equipment stoppage. Other advantages will be apparent from the detailed discussion which follows.

In operating the process of this invention, the polymer formed in either a batch or continuous polymerization process is filtered and washed with deionized water, after stopping the polymerization reaction by addition of an iron-sequestering agent such as the tetrasodium salt of ethylene-diamine tetracarboxylic acid and adjustment of pH to a suitable level by addition of an acidic or akaline reagent if required. The combined stream of filtrate and water washings, containing the unreacted monomers, is fed to a distillation column where the monomers are volatilized rapidly to separate them from the bulk of the water and from the non-volatile polymerization by-products. The vapors from the distillation column are condensed and treated with a polymerization inhibiting agent such as paramethoxy phenol and an iron-sequestering agent such as described above. The collected condensate is fed to a decanter where it separates into two layers. The top layer consists essentially of recovered monomers with some dissolved and entrained water. The bottom layer consists essentially of water which contains some dissolved monomers. The two layers are separated by decantation. The bottom layer is returned to the recovery process and the top layer is retained for subsequent use in the polymerization process.

In a preferred process, the polymerization is conducted at a pH from about 2.5 to 5.0 or preferably 2.5 to 3.6 under conditions of constant environment with the monomers to be recovered being present in the aqueous slurry continuously overflowing from the polymerization vessel. Polymerization is terminated in the overflowing slurry by the addition of about 50 to about 500 p.p.m. of a sequestering agent based on the weight of slurry. The polymer is isolated from the mixture by any convenient means, such as by filtration. The pH of the filtrate is adjusted to from 2.5 to 4.8, preferably 2.8 to 3.5, by the addition of an acidic material, preferably sulfur dioxide, and 5–15 p.p.m. additional sequestering agent is added. The filtrate is accumulated in a tank from which it is pumped, with minimum hold-up, optionally through a preheater, to the top plate of a stripping column with further adjustment of pH, if necessary. If hold-up is practiced, it is desirable to cool the filtrate while in storage. Steam is injected into the base of the column, and water and non-volatiles are discharged at this point. Into the condensing vapors which are collected from the top of the column, at least about 40 parts per million and suitably 40 to 400 p.p.m. (based on the weight of monomers in the distillate) of a polymerization inhibiting agent, preferably p-methoxyphenol, and at least aobut 40 p.p.m. and suitably 40 to about 400 p.p.m. (based on the weight of water in the distillate) of an iron sequestering agent, such as tetrasodium ethylene diamine tetraacetate, are introduced. The condensate is fed to a decanter where the monomers (top layer), mainly acrylonitrile, which constitute about 15 to about 40% of the distillate, are separated from the water. To this monomer layer may be added about 10 to 400 p.p.m. of the iron sequestering agent, based on the monomer recovered; alternatively, a small amount (up to 10%, or even 15%) of the water layer (containing the sequestering agent) from the decanter may be diverted to the separated monomer layer to provide assured protection against polymerization of monomer in the small amount of entrained or dissolved water which later separates from the monomer layer. This separated aqueous layer, which may contain additional water layer from the decanter, is returned to the distillation column for recovery of the monomer (up to 7%) it contains.

The amino carboxylic acid sequestering agents which may be used are those of the type capable of sequestering manganese, cupric, and ferric ions under acidic conditions. This type of sequestering agent is described in Smith, R. L., "The Sequestration of Metals," Chapman & Hill, Ltd., London, 1959, pp. 70–105. Representative of these agents are ethylene diamine tetraacetic acid, diethylene triamine pentaacetic acid, nitrilo triacetic acid, 1,2-diamino-cyclohexane tetraacetic acid, hydroxyethyl derivatives of amino triacetic acid and ethylene diamine tetraacetic acid, the water-soluble alkali metal, alkaline earth metal and amonium salts of such acids, or the mixed salts thereof. The di-, tri-, and the tetra-salts of sodium and potassium are preferred based on their improved solubility in the aqueous media employed.

The polymerization inhibitor may be selected from phenols having the structural formula

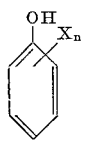

wherein X is selected from the class consisting of H, OH, aliphatic and alkoxy radicals having from one to fifteen carbon atoms, and aryloxy- and phenolic-substituted radicals having from six to fifteen carbon atoms, and $n$ is an integer from one to five. Representative of these compounds are hydroquinone, catechol, resorcinal, methoxyphenols, benzyloxyphenols, and di-t-butyl-p-cresols.

By an excess of sulfoxy activator is meant an amount in excess of that necessary to activate the polymerization reaction. Generally the presence of a sulfoxy activator and a peroxygen catalyst in a weight ratio of 6:1 or higher will result in a suitable excess of the activator. Amounts of sodium metabisulfite as activator in the range of about 1.0% to about 4.0% by weight of the polymerizable monomers and amounts of potassium perdisulfate as catalyst in the range from about 0.08% to about 0.70%, based on the weight of the monomers are preferred, but many alternative combinations are known.

The sulfoxy activator and the peroxygen catalyst may be selected from any of those which are well known as useful in a redox catalyst system. In addition to the water-soluble derivative of a perdisulfuric acid such as potassium persulfate other peroxy compounds such as a chlorate, for example, may be used in combination with a water-soluble, oxidizable sulfoxy compound in which the valence of the sulfur atom does not exceed four, such as sodium metabisulfite, sodium bisulfite, sodium hydrosulfite, sulfur dioxide, and other water-soluble, oxidizable sulfoxy compounds. Amounts of an ionizable heavy metal salt, i.e. chloride, bromide, nitrate, sulfate or the like, for example, iron, manganese, or copper, on the order of about 0.05 to about 0.75 or even up to about 1.25 parts per million (based on the weight of the reaction mixture) may be used.

In adjusting the pH of the filtrate, any of a number of acidic or alkaline compounds which are ionizable in the filtrate may be used. Among the suitable acidic compounds are any mineral or organic acid such as, for example, acetic acid, sulfuric acid, sulfurous acid, hydrochloric acid, phosphoric acid, sulfamic acid, sulfur dioxide, soluble bisulfite salts, or monobasic sodium phosphate. The conveniently useful alkaline compounds include sodium or potassium carbonates, borates, hydroxides, acetates, as well as others.

The following examples are given to further illustrate the process of the present invention. Parts and percentages are by weight unless otherwise specified.

EXAMPLE 1

To a continuous polymerization vessel partly filled with water acidified with sulfur dioxide to a pH of 3.2±0.10 and heated to 60° C., are added continuously a water solution containing 0.2% sulfur dioxide, a water solution containing 4.00% potassium persulfate, a water solution containing 20.0 sodium metabisulfite, a water solution containing 4.00% sodium styrenesulfonate, and mixture of acrylonitrile and methyl acrylate along with demineralized water containing a small controlled amount of iron to provide about 0.56 part per million of iron in the reaction mixture. The combined feeds are calculated to give a 56-minute hold-up time in the reactor after steady-state conditions have been established. The feed composition, expressed as parts by weight per unit of time, is as given below:

| | Parts |
|---|---|
| Acrylonitrile | 291 |
| Methyl acrylate | 18.9 |
| Potassium persulfate | 0.68 |
| Sodium metabisulfite | 9.3 |
| Sodium styrenesulfonate | 0.6 |
| Water plus $SO_2$ to pH 3.1–3.3 | 679.52 |

An atmosphere of inert gas is maintained in the reaction vessel and the temperature is held at 60° C. by jacket cooling. The reaction mixture overflowing from the reactor is treated with 0.26 part ethylene diamine tetraacetic acid sodium salt at a constant rate, during the time required to feed the reagents listed above, and fed into a continuous vacuum filter which serves to isolate the polymer from the aqueous phase. The polymer is washed on the filter with hot, demineralized water and the aqueous effluent from the filter combined into a single filtrate amounting to about 3000 parts for subsequent recovery. The yield of polymer is 81.5%, leaving about 18.5% of the monomer fed to be recovered. The polymer has an intrinsic viscosity of 1.50. It is dry-spun from dimethylformamide solution by conventional methods to yield a fiber of excellent whiteness.

The combined filtrate, containing about 2% monomers, is continuously treated with 500 parts of sulfur dioxide per million parts of filtrate which reduces its pH to 3.1±0.2 and with 9 parts per million additional ethylene diamine tetraacetic acid sodium salt. The filtrate is collected in an accumulator tank for immediate recovery.

A stripping column containing 30 sieve plates is equipped to receive filtrate feed on the 30th plate, for introduction of steam below the first plate, and for overhead take-off to an efficient condenser. After bringing the column to equilibrium temperature, using water as feed, filtrate from the accumulator tank is pumped to the 30th plate at a steady rate which yields a product comprising approximately 3 parts water per 1 part of monomer. Just prior to its introduction into the column, the filtrate is treated continuously with the amount of 5% aqueous sodium carbonate solution required to bring its pH to 3.5±0.3. As the column product is condensed 100 p.p.m. of ethylene diamine tetraacetic acid sodium salt and 37 p.p.m. of monomethyl ether of hydroquinone are added. The condensate is separated into two layers in a decanter. The lower aqueous layer is returned to the accumulator tank. To the upper monomer layer, which contains a small amount of finely dispersed aqueous phase, is continuously added about 10% of the total decanted aqueous phase before delivery to a holding tank. The water layer which separates at this point is recycled to the accumulator tank. The clear monomer layer contains about 0.5% $SO_2$ and has a pH of 2.5 as measured in a 5% solution in water, and is found to have excellent stability and quality for reuse, which involves blending with new, slightly alkaline or slightly acidic monomer.

The stripper column tails, comprising process water and water-soluble, non-volatile products of the polymerization process are analyzed for nitrogen content to estimate monomer loss to the non-volatile bisulfite adduct. An overall loss of 1.4% is observed. Analysis for biochemical oxygen demand on the Warburg apparatus (described in Caldwell, D. H. and Langelier, W. F., "Manometric Measurement of B.O.D. of Sewage," Wks. J., 20, 1948, pp. 202–218) shows a total of 0.020 part of biochemical oxygen demand per part of monomer fed.

It has been found convenient to control the amount of sulfur dioxide appearing in the recovered monomer by adjustment of the pH of the feed. For example, if it is found that less than 0.45% $SO_2$ appears in the recovered monomer, the feed is adjusted to pH 3.3±0.3. When 0.55–0.70% $SO_2$ appears in the product monomer, it is reduced to mid-range by adjustment of pH to 4.0±0.3 in the feed.

EXAMPLE 2

To a continuous polymerization vessel partly filled with water acidified with sulfur dioxide to a pH of 2.8±0.2 and heated to 55° C., are added continuously a water solution containing 1 to 2% sulfurous acid, a water solution containing 4.0% potassium persulfate, a water solution containing 18.3% sodium metabisulfite, a water solution containing 2.0% sodium styrenesulfonate, and a mixture of acrylonitrile and methyl acrylate along with demineralized water containing a small controlled amount of iron to provide about 0.45 part per million of iron in the reaction mixture. The combined feeds are calculated to give a 75-minute hold-up time in the reactor after steady-state conditions have been established. The feed composition, expressed as parts by weight per unit of time is as given below:

| | Parts |
|---|---|
| Acrylonitrile | 276.4 |
| Methyl acrylate | 18 |
| Potassium persulfate | 0.7 |
| Sodium metabisulfite | 8.6 |
| Sodium styrenesulfonate | 0.8 |
| Water plus $SO_2$ to pH 2.8 | 695.5 |

An atmosphere of inert gas is maintained in the reaction vessel and the temperature is held at 55° C. by jacket cooling. The reaction mixture overflowing from the reactor is treated with 0.292 part ethylene diamine tetraacetic acid sodium salt at a constant rate, during the time required to feed the reagents listed above, and fed into a continuous vacuum filter which serves to isolate the polymer from the aqueous phase. The polymer is washed on the filter with hot, demineralized water and the aqueous effluent from the filter combined into a single filtrate for subsequent recovery. The yield of polymer is 80%, leaving about 20% of the monomer fed to be recovered. The polymer has an intrinsic viscosity of 1.50. It is dry-spun from dimethyl-formamide solution by a conventional method to yield a fiber of excellent whiteness.

The combined filtrate is continuously treated with sulfur dioxide which reduces its pH to 3.5±0.5. The filtrate is collected in an accumulator tank for immediate recovery.

A stripping column containing 20 sieve plates is equipped to receive filtrate feed on the 20th plate, for introduction of steam below the first plate, and for overhead take-off to an efficient condenser. Filtrate from the accumulator tank is pumped to the 20th plate at a steady rate which yields a product comprising approximately 2 parts water per 1 part of monomer. Just prior to its introduction into the column, the filtrate having a controlled pH 3.5±0.5 is treated continuously with injected steam to a temperature of 72±3° C. As the column product is condensed, a solution of ethylene diamine tetraacetic acid sodium salt sufficient to maintain 30–40 p.p.m. in the aqueous phase after decanting and monomethyl ether of hydroquinone sufficient to maintain 50–80 p.p.m. in the monomer phase after decanting are added. The condensate is separated into two layers in a decanter. The lower aqueous layer is returned to the accumulator tank. To the upper monomer layer, which contains a small amount of finely dispersed aqueous phase, is continuously added about 100 p.p.m. of ethylene diamine tetraacetic acid sodium salt, weight basis, before delivery to a product receiver. The water layer which separates in the product receiver is recycled to the accumulator tank. The clear monomer layer has a pH of 2.6±0.3, as measured in a 5% solution in water, and is found to have excellent stability and quality for reuse, which involves blending with new monomer.

The stripper column tails, comprising process water and water-soluble, non-volatile products of the polymerization process are analyzed for nitrogen content to estimate monomer loss to the non-volatile bisulfite adduct. A loss of approximately 1.1% of the monomer fed to the reactor is observed.

EXAMPLE 3

To a continuous polymerization vessel partly filled with water acidified with sulfuric acid to a pH of 3.6 and heated to 45° C., a water solution containing 0.5% sulfuric acid, a water solution containing 0.4% potassium persulfate, a water solution containing 8.0% sodium metabisulfite, a water solution containing 1.0% sodium styrenesulfonate, and a mixture of acrylonitrile and methyl acrylate are fed together with an amount of water containing a small controlled amount of iron to provide about 0.2 part per million of iron in the reaction mixture and calculated to give a 91-minute hold-up time in the reactor after steady-state conditions are established. The feed composition, expressed as parts by weight, is as given below:

| | Parts |
|---|---|
| Acrylonitrile | 2068 |
| Methyl acrylate | 132 |
| Potassium persulfate | 5.7 |
| Sodium metabisulfite | 88 |
| Sodium styrenesulfonate | 5.7 |
| Water plus $H_2SO_4$ to pH 3.6 | 7700.6 |

An atmosphere of inert gas is maintained in the reaction vessel and the temperature held at 45° C. The reaction mixture overflowing from the reactor is treated with 6 parts ethylene diamine tetraacetic acid sodium salt at a constant rate during the time required to feed the reagents listed above and fed to a continuous vacuum filter which serves to isolate the polymer from the aqueous phase. The polymer is washed on the filter with hot, demineralized water and the aqueous effluent from the filter combined into a single filtrate for subsequent recovery. The yield of polymer is 73%, leaving about 27% of the monomer fed to be recovered. The polymer has an intrinsic viscosity of 1.45. It is dry spun from dimethylformamide solution by conventional methods to yield a fiber of excellent whiteness.

The combined filtrate is rapidly cooled to 35° C. and continuously treated with 3.5 parts sulfur dioxide which reduced its pH to 3.0, and with 10 parts per million additional ethylene diamine tetraacetic acid sodium salt, based on the contained monomer. The filtrate is collected in an accumulator tank for later recovery.

A stripping column containing 30 sieve plates is equipped to receive feed on the 30th plate for introduction of steam below the first plate and for overhead take-off to an efficient condenser. After bringing the column to equilibrium temperature, using water as feed, filtrate from the accumulator tank is pumped to the 30th plate at a steady rate which yields a product comprising approximately 5 parts water per 3 parts of monomer. Just prior to its introduction into the column, the filtrate is treated continuously with the amount of 5% sodium carbonate solution required to bring its pH to 4.0±0.5. As the column product is condensed, 500 parts per million of ethylene diamine tetraacetic acid sodium salt and 25 parts per million of monomethyl ether of hydroquinone are added. The condensate separates into two layers in a decanter. The lower aqueous layer is returned to the accumulator tank. The upper monomer layer which contains a small amount of finely dispersed aqueous phase, is continuously treated with sufficient aqueous sodium carbonate solution to result in a pH of 5.0 to 6.5 (as measured on a 5% aqueous solution of the monomer) and delivered to a holding tank. A small additional water layer which separates at this point is also recycled to the accumulator tank. The clear monomer layer has a pH of 4.5, as measured in a 5% solution in water, and is found of excellent stability and quality for reuse, which involves blending with new, slightly alkaline monomer.

The stripper column tails, comprising process water and water-soluble, non-volatile products of the polymerization process, are collected and analyzed for nitrogen content to estimate monomer loss to the non-volatile bisulfite adduct. A loss of 1.4% was observed. Analysis for biochemical oxygen demand shows a total of 0.020 part of biochemical oxygen demand per pound of monomer fed, based on the ingredients listed in this table.

EXAMPLE 4

The polymerization of Example 3 is repeated using sodium carbonate to pH 9.5 to stop the polymerization in the overflowing reaction medium in place of the ethylene diamine tetraacetic acid sodium salt, which is also omitted at all other stages of the process. Additional sodium carbonate is added to the combined filtrate to effect a pH of 9.5±0.2 before delivery to the accumulator tank. The filtrate is fed to the stripper column of Example 3 without further treatment. The decanted monomor is found of excellent quality and stability. A 5% solution of the recovered monomer in water has a pH of 5.0.

Analysis of the column tails shows 2.5% monomer loss and 0.039 part biochemical oxygen demand per part of monomer fed to the reactor.

The polymer has an intrinsic viscosity of 1.47 and is satisfactory for dry spinning, although it leads to a fiber whiteness appreciably inferior to that obtained from the polymer of Example 3.

EXAMPLE 5

The polymerization of Example 3 is repeated through isolation and washing exactly as in that example. After combining the filtrates, approximately 50 parts of 5% sodium carbonate solution are continuously added to result in a pH of 9.5±0.5 as the filtrate is fed to the accumulator tank. Steam stripping as in Example 4 for recovery of the combined monomer reveals losses of monomer and biochemical oxygen demand equivalent to those of that example. The polymer is equivalent to that of Example 3 in all respects.

EXAMPLE 6

Example 3 is repeated except that no ethylene diamine tetraacetic acid sodium salt is added to the combined filtrates prior to feeding to the accumulator tank or to the stripper column product, and no decanted aqueous layer or aqueous sodium carbonate solution is added to the decanted monomer. During stripping of this filtrate it becomes evident that polymerization of monomer is taking place in the column, resulting in appreciable increase in pressure drop as the stripping continues. It is evident that a short column life between cleanings should be experienced with filtrate of this quality as feed. The decanted monomer is, in most respects, equivalent to that of Example 3. It is found, however, that when this monomer is blended with new, slightly alkaline monomer for reuse a white solid separates which leads to further difficulties in equipment pluggage.

From the foregoing examples it will be apparent that the requirements for efficient monomer recovery and low biochemical oxygen demand in a polymer process employing an excess of sulfoxy reducing agent are met by utilizing a sequestering agent and phenol stabilizer at critical points in the process, together with control of pH throughout the process. It has been found that loss of monomer through addition of bisulfite to the monomer increases with higher pH in the filtrate such that essentially quantitative conversion of the reagent present in lesser quantity occurs at pH above 7.0. Little or none of this addition takes place at pH 3.0 or lower. Although a filtrate pH as low as 1.5 is satisfactory for the purposes of this invention, it offers no advantage over 3.0, which is the preferred lower limit for over-all process economy.

The process of this invention is particularly applicable in recovering monomers from the filtrate obtained during the preparation of polymers having at least 85% combined acrylonitrile in the polymer. One or more ethylenically unsaturated monomers which are copolymerizable with acrylonitrile may be present. Included among such monomers are those mentioned in U.S. Patent 2,975,022, as well as those of the type described in British Patent 847,577. Other examples of amino carboxylic acid sequestering agents as well as sulfoxy activators and persulfate catalysts are also described in the just-mentioned British patent. In addition to those phenols already mentioned, p-benzyloxyphenol, 2,6-di-t-butyl-p-cresol and 2,2'-methylene-bis(4-methyl-6-t-butylphenol) may be used in the instant process.

The chief advantage accruing from the process of the present invention resides in the ability to recover a high percentage of the monomers from the filtrate obtained in isolating the polymeric product. This high recovery rate is obtained without the production of harmful by-products which clog or contaminate the recovery system or lead to the formation of waste which creates a disposal problem. In addition, the monomer recovered is of high quality and can be readily utilized in the polymerization system. All parts and percentages stated herein are by weight unless otherwise indicated.

As many widely different embodiments of this invention may be made without departing from the spirit and scope thereof, it is to be understood that this invention is not to be limited to the specific embodiments thereof except as defined in the appended claims.

We claim:
1. In a process for recovering unpolymerized monomers from an aqueous filtrate obtained by washing with water and filtering acrylonitrile polymer prepared by a process wherein at least 85% acrylonitrile and up to 15% of an ethylenically unsaturated copolymerizable monomer are polymerized at a pH of from about 2.5 to 5.0 in the presence of a sulfoxy activator and a peroxygen catalyst present in a ratio to provide an excess of activator, and trace amounts of a heavy metal ion with polymerization being terminated by addition of about 50 to 500 parts per million parts of filtrate of an amino carboxylic acid sequestering agent to said medium, the method of recovering unpolymerized monomers comprising
(a) adjusting the pH of said filtrate to provide a pH from about 2.5 to about 4.8, by adding sulfur dioxide,
(b) passing the resulting filtrate into a distillation zone and vaporizing acrylonitrile monomer therefrom,
(c) adding to the resulting acrylonitrile-containing vapor about 40 to about 400 parts per million based on the weight of monomers in the distillate of a phenol having the formula

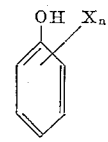

wherein X is selected from the class consisting of H, OH, aliphatic and alkoxy radicals having from one to fifteen carbon atoms, and aryloxy- and phenolic-substituted radicals having from six to fifteen carbon atoms, and $n$ is an integer from one to five, and about 40 to about 400 parts per million based on the weight of monomers in the distillate of said amino carboxylic acid sequestering agent,
(d) condensing the vapors and permitting two liquid layers to form, and
(e) returning the top monomer layer to the polymerization zone and returning the bottom aqueous layer to the distillation zone.

2. The process of claim 1 wherein said sequestering agent is the sodium salt of ethylene diamine tetraacetic acid.

3. The process of claim 2 wherein said phenol is p-methoxy phenol.

4. The process of claim 3 wherein said activator is sodium metabisulfite and said catalyst is potassium persulfate.

5. The process of claim 1 in which additional sequestering agent is added to the top monomer layer to prevent undesired polymerization.

References Cited by the Examiner

UNITED STATES PATENTS

| | | | |
|---|---|---|---|
| 2,648,562 | 5/1953 | Stanton et al. | 260—85.5 |
| 3,060,159 | 10/1962 | Lea et al. | 260—85.5 |

OTHER REFERENCES

Chemstrand Corp.: Chem. Abs., 52 (1958), p. 17804C.
Naito et al.: Chem. Abs., 52 (1958), p. 21245i.

JOSEPH L. SCHOFER, *Primary Examiner.*

HARRY WONG, JR., *Examiner.*